(12) United States Patent
Savatic

(10) Patent No.: US 11,747,354 B2
(45) Date of Patent: Sep. 5, 2023

(54) METHOD AND SYSTEM TO RE-IDENTIFY CARRIERS ON A LABORATORY TRANSPORT SYSTEM

(71) Applicant: Roche Diagnostics Operations, Inc., Indianapolis, IN (US)

(72) Inventor: Goran Savatic, Littau (CH)

(73) Assignee: Roche Diagnostics Operations, Inc., Indianapolis, IN (US)

(*) Notice: Subject to any disclaimer, the term of this patent is extended or adjusted under 35 U.S.C. 154(b) by 386 days.

(21) Appl. No.: 17/211,113

(22) Filed: Mar. 24, 2021

(65) Prior Publication Data

US 2021/0302449 A1    Sep. 30, 2021

(30) Foreign Application Priority Data

Mar. 26, 2020 (EP) .................................. 20165745

(51) Int. Cl.
*G01N 35/00* (2006.01)

(52) U.S. Cl.
CPC . *G01N 35/00732* (2013.01); *G01N 35/00623* (2013.01); *G01N 2035/00752* (2013.01)

(58) Field of Classification Search
CPC ....... G01N 35/00732; G01N 35/00623; G01N 2035/00752; G01N 2035/00801;
(Continued)

(56) References Cited

U.S. PATENT DOCUMENTS 7,746,228 B2    6/2010   Sensenig et al.
9,567,167 B2    2/2017   Sinz
(Continued)

FOREIGN PATENT DOCUMENTS

EP    2988134 A1    2/2016
EP    2566787 B1    3/2016
(Continued)

OTHER PUBLICATIONS

European Search Report dated Sep. 10, 2020, in Application No. EP 20165745.9, 2 pp.
(Continued)

*Primary Examiner* — Jill A Warden
*Assistant Examiner* — John McGuirk
(74) *Attorney, Agent, or Firm* — Roche Diagnostics Operations, Inc.

(57) ABSTRACT

The present disclosure relates to a method to re-identify a carrier on a laboratory transport system after a system failure. The carrier is associated with an identity and is configured to move over a transport plane of the laboratory transport system. The laboratory transport system comprises a monitoring system configured to monitor motion positions of the carrier on the transport plane when the laboratory transport system is activated. After a system failure, the identity dissociates from the carrier and the carrier keeps moving on the transport plane. After reactivation of the laboratory transport system, a predicted position of the identity is compared to an actual position of the carrier by a control unit of the laboratory transport system. The control unit assigns the identity to the carrier if the predicted position of the identity matches with the actual position of the carrier.

13 Claims, 6 Drawing Sheets

(58) Field of Classification Search
CPC ... G01N 2035/0406; G01N 2035/0477; G01N 35/04; G01N 2035/0493; G01N 35/00722; G01N 2035/0491; B65G 43/00
See application file for complete search history.

(56) References Cited

U.S. PATENT DOCUMENTS

| | | |
|---|---|---|
| 2010/0025464 A1 | 2/2010 | Trueeb et al. |
| 2010/0332125 A1* | 12/2010 | Tan ....................... G01S 19/396 701/408 |
| 2015/0140668 A1* | 5/2015 | Mellars ............ G01N 35/00732 422/67 |
| 2017/0283845 A1 | 10/2017 | Holmes et al. |
| 2019/0370746 A1* | 12/2019 | Martinos ................. H04L 67/10 |

FOREIGN PATENT DOCUMENTS

| | | |
|---|---|---|
| EP | 3070479 A1 | 9/2016 |
| EP | 3349015 B1 | 3/2020 |
| WO | 2011/138448 A1 | 11/2011 |
| WO | 2012/033807 A1 | 3/2012 |
| WO | 2018/005129 A1 | 1/2018 |

OTHER PUBLICATIONS

Tao, Yufei et al., Prediction and Indexing of Moving Objects with Unknown Motion Patterns, Sigmod, 2004, 611-622.

* cited by examiner

| time points | motion positions | identity |
|---|---|---|
| TP 1 | D1 | ABC123 |
| TP 2 | D2 | ABC123 |
| TP 3 | D3 | ABC123 |
| TP 4 | D4 | ABC123 |
| TP 5 | C4 | ABC123 |
| TP 6 | B4 | ABC123 |
| TP 7 | A4 | ABC123 |

| A1 | A2 | A3 | A4 | A5 | A6 |
|----|----|----|----|----|----|
| B1 | B2 | B3 | B4 | B5 | B6 |
| C1 | C2 | C3 | C4 | C5 | C6 |
| D1 | D2 | D3 | D4 | D5 | D6 |
| E1 | E2 | E3 | E4 | E5 | E6 |
| F1 | F2 | F3 | F4 | F5 | F6 |

FIG. 3C

| A1 | A2 | A3 | A4 | A5 | A6 |
|----|----|----|----|----|----|
| B1 | B2 | B3 | B4 | B5 | B6 |
| C1 | C2 | C3 | C4 | C5 | C6 |
| D1 | D2 | D3 | D4 | D5 | D6 |
| E1 | E2 | E3 | E4 | E5 | E6 |
| F1 | F2 | F3 | F4 | F5 | F6 |

FIG. 3D

| time points | predicted position of identity | actual position of carrier |
|-------------|-------------------------------|---------------------------|
| TP 5        | D6                            |                           |
| TP 6        |                               | D6                        |

| time points | motion positions | identity |
|-------------|------------------|----------|
| TP 1        | D1               | ABC123   |
| TP 2        | D2               | ABC123   |
| TP 3        | D3               | ABC123   |
| TP 4        | D4               | ABC123   |
|             |                  | ABC123 * |
| TP 7        | D6               | ABC123   |

FIG. 3E

METHOD AND SYSTEM TO RE-IDENTIFY CARRIERS ON A LABORATORY TRANSPORT SYSTEM

CROSS-REFERENCE TO RELATED APPLICATIONS

This application claims priority to EP 20165745.9, filed Mar. 26, 2020, which is hereby incorporated by reference.

BACKGROUND

The present disclosure generally relates to the field of automated in vitro diagnostic laboratory testing and, in particular, to a method, a laboratory transport system, a computer program product, and a computer-readable storage medium to re-identify carriers on a laboratory transport system after a system failure.

In diagnostic laboratory systems, payloads like test sample vessels, test reagent containers, or test consumable containers are transported between multiple stations such as pre-analytical, analytical and post-analytical stations according to predefined laboratory workflows. Typically, such vessels and containers are transported in carriers. In fully automated diagnostic laboratory systems, the carriers are moved on a transport plane of a laboratory transport system in order to distribute the vessels and containers to connected pre-analytical, analytical and post-analytical stations, which can conduct different sample processing steps like preparing, analysing, or archiving of test samples.

With improved throughputs, improved turnaround times, and growing test portfolios of automated diagnostic laboratory systems, the number of transported payloads as well as the complexity of transport routes on the laboratory transport system are increasing. Furthermore, the time to transport test samples to analytical stations should not be the limiting factor in a laboratory workflow so that test results or validation results are provided on time and with required quality for further diagnosis. For transporting a certain carrier from a predefined starting position to a predefined destination on time, a reliable and effective identification and localization of the carrier on the laboratory transport system is required.

Therefore, there is a need to re-identify carriers on a laboratory transport system after a system failure in a simple, reliable and cost-efficient way, thereby better serving the needs of automated in vitro diagnostic laboratory testing.

SUMMARY

According to the present disclosure, a method to re-identify a carrier on a laboratory transport system is presented. The carrier can be associated with an identity. The carrier can be configured to move over a transport plane of the laboratory transport system. The laboratory transport system can comprise a monitoring system configured to monitor motion positions of the carrier on the transport plane when the laboratory transport system is activated. The laboratory transport system can comprise a control unit. The method can comprise monitoring, by the monitoring system, motion positions of the carrier on the transport plane; generating, by the control unit, log data of the carrier and the associated identity based on the monitored motion positions; and predicting, by the control unit, the position of the identity based on the generated log data after a system failure of the laboratory transport system. The system failure is a monitoring system failure that causes dissociation of the identity from the carrier. After the system failure, the carrier can keep moving on the transport plane. The method can also comprise detecting, by the monitoring system, the actual position of the carrier after reactivation of the laboratory transport system, comparing, by the control unit, the predicted position of the identity with the actual position of the carrier; and assigning, by the control unit, the identity to the carrier if the predicted position of the identity matches with the actual position of the carrier.

Accordingly, it is a feature of the embodiments of the present disclosure to re-identify carriers on a laboratory transport system after a system failure in a simple, reliable and cost-efficient way, thereby better serving the needs of automated in vitro diagnostic laboratory testing. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 3A-3E illustrate an example of how a carrier moves on the transport plane before and after a system failure and how the carrier is re-identified after the system failure according to an embodiment of the present disclosure.

DETAILED DESCRIPTION

Figure 1:
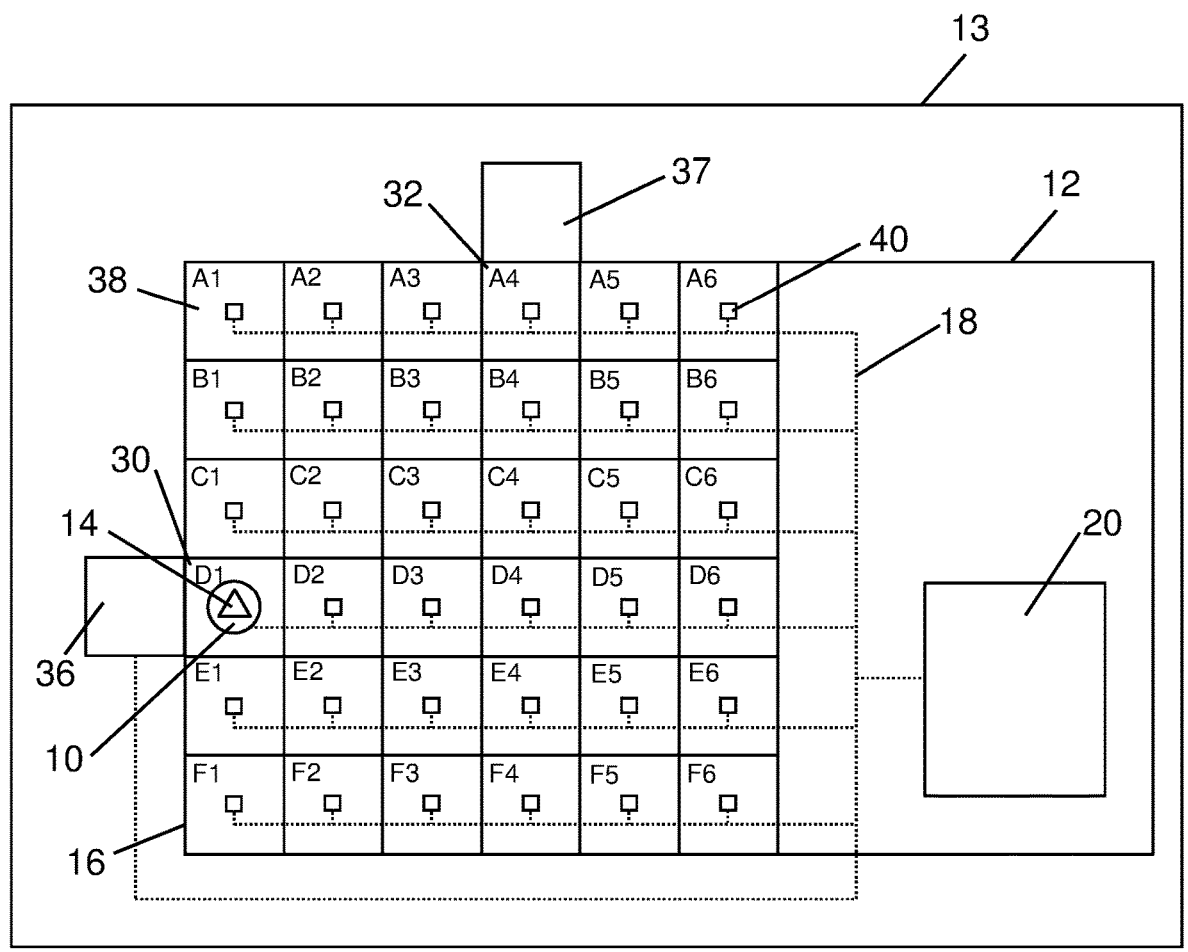
FIG. 1 illustrates a schematic representation of a laboratory system comprising a laboratory transport system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The present disclosure relates to a method to re-identify a carrier on a laboratory transport system. The carrier can be associated with an identity and the carrier can be configured to move over a transport plane of the laboratory transport system. The laboratory transport system can comprise a monitoring system configured to monitor motion positions of the carrier on the transport plane when the laboratory transport system is activated. The laboratory transport system can comprise a control unit. The method can comprise a) monitoring, by the monitoring system, motion positions of the carrier on the transport plane, b) generating, by the control unit, log data of the carrier and the associated identity based on the monitored motion positions, c) predicting, by the control unit, the position of the identity based on the generated log data after a system failure of the laboratory transport system, wherein the system failure causes dissociation of the identity from the carrier, wherein after the system failure the carrier keeps moving on the transport plane, d) detecting, by the monitoring system, the actual position of the carrier after reactivation of the laboratory transport system, e) comparing, by the control unit, the predicted position of the identity with the actual position of the carrier, and f) assigning, by the control unit, the identity to the carrier if the predicted position of the identity matches with the actual position of the carrier.

As used herein, the term "carrier" can relate to a device configured for receiving, holding, transporting, and/or releasing a payload such as a test sample vessel, test reagent container, or test consumable container. A test sample vessel can be configured for receiving, holding, transporting, and/or releasing a test sample or a mixture of a test sample and test reagent. A test reagent container can be configured for receiving, holding, transporting, and/or releasing a test reagent. A test consumable container can be configured for receiving, holding, transporting, and/or releasing a test consumable such as, as non-limiting example, pipetting tips. For transporting or moving a test sample vessel, test reagent container, or test consumable container on a laboratory transport system, the test sample vessel, test reagent container, or test consumable container can be inserted into a holder of the carrier. In a further embodiment, the carrier can comprise at least one magnetically active device, which can interact with a magnetic field so that a magnetic force can be applied to the carrier in order to move the carrier on the transport plane. In a further embodiment, the carrier can further comprise a bottom plate on which the carrier can slide over the transport plane of the laboratory transport system. Thus, the carrier can slide over the transport plane when the laboratory transport system is activated or the carrier slides in the same motion direction over the transport plane after a system failure due to its remaining kinetic energy. A carrier comprising at least one magnetically active device, which can interact with a magnetic field and a bottom plate for sliding over the transport plane, is well known in the art and may be designed as described in EP2988134A1 and in EP3070479A1, which are hereby incorporated by reference.

The carrier can be associated with an identity. As used herein, the term "identity" can relate to an identifier for the distinct identification of a carrier and/or its payload. Thus, the identity may depend on the payload of the carrier. In one embodiment, the identity can relate to an identity of a test sample if the carrier holds a test sample vessel containing a test sample. In another embodiment, the identity can relate to an identity of a control sample if the carrier holds a control sample vessel containing a control sample. In a further embodiment, the identity can relate to an identity of a test reagent if the carrier holds a test reagent container containing a test reagent. In a further embodiment, the identity can relate to an identity of a consumable if the carrier holds a consumable container containing a consumable. In an alternative embodiment, the identity can be a carrier identity if the carrier does not hold a test sample vessel containing a test sample. The identity can also be a carrier identity if the carrier does not hold any other payload such as a control sample vessel containing a control sample, a test reagent container containing a test reagent, or consumable container containing a consumable.

As used herein, the term "associated or associated identity" can mean that the identity of a carrier and/or its payload can be assigned or linked to a position of the carrier on the transport plane. For example, a carrier and/or its payload may be provided with a barcode tag or RFID tag comprising the identity of the carrier and/or its payload. The carrier and/or its payload may be placed at a certain position on the transport plane, e.g., at a starting position. At the starting position, a carrier identification unit connected to the laboratory transport system may determine the identity of the carrier and/or its payload. The determined identity of the carrier and/or its payload can then be associated to the carrier by assigning the determined identity of the carrier and/or its payload to the carrier position on the transport plane. Alternatively, the identity of the carrier and/or its payload may be associated to the carrier by assigning the identity of the carrier and/or its payload to a position of the carrier on the transport plane in a database record. Thus, the carrier may be placed on a position on the transport plane and the identity of the carrier and/or its payload and the carrier position may be entered manually in a cross table of a database. If the carrier moves to an adjacent position on the transport plane, the associated identity can be assigned to the adjacent position where the carrier is located. In other words, the associated identity can move together with the carrier on the transport plane. Accordingly, the associated identity can be localized on the transport plane just by monitoring motion positions of the carrier on the transport plane without repeated determining of the identity of the carrier and/or its payload by a carrier identification unit. However, the associated identity can be lost or dissociated from the carrier, as soon as no motion positions of the carrier are monitored. As only the carrier, but not the identity, can be sensed or detected over time on the transport plane by the monitoring system, a system failure can cause dissociation of the identity from the carrier.

In one embodiment, the identity can be associated with information of the carrier and/or its payload. In one embodiment, this information can comprise a carrier feature and/or a payload feature. Alternatively, this information can relate to information from which a carrier feature and/or payload feature can be derived. Carrier and payload features can relate to a physical property of the carrier and/or its payload and may determine the motion behavior of the carrier after a system failure when the carrier keeps moving on the transport plane. The identity may be associated with carrier features, such as, as non-limiting examples, carrier weight, carrier dimension and/or geometric form, and the like. Additionally, or alternatively, the identity may be associated with payload features such as, as non-limiting examples, test sample vessel weight, test sample vessel dimension and/or geometric form, test sample volume, test sample weight, and the like. Information from which a carrier feature or payload feature may be derived are, as non-limiting examples, carrier type, carrier onboard time, payload type, payload expiration date, and the like.

In one embodiment, additional information that may be relevant for the transportation of the carrier on the laboratory transport system can be associated with the identity. Such information can include information about ordered test(s) for a test sample, transportation route(s) of a carrier on the transport plane and/or corresponding starting position(s), destination position(s), and the like.

As used herein, the term "laboratory transport system" can relate to a system designed to transport or distribute payloads such as test sample vessels, test reagent containers, or test consumable containers to connected pre-analytical stations, analytical stations, or post-analytical stations of a diagnostic laboratory system. A pre-analytical station can usually be used for the preliminary processing of test samples or test sample vessels. An analytical station can be designed, for example, to use a test sample or part of the test sample and a test reagent in order to produce a measurable signal, on the basis of which it can be possible to determine whether an analyte is present, and, if desired, in what concentration. A post-analytical station can be used for the post-processing of test samples or test sample vessels like the archiving of test samples or test sample vessels. Such pre-analytical stations, analytical stations, post-analytical stations, and devices are well known in the art.

The laboratory transport system can comprise a transport plane on which carriers can be transported or moved. The carrier may move along transportation routes on the transport plane. As used herein, the term "transportation route" can relate to a path a carrier can move from a starting position to a destination position on the transport plane. The carrier may move directly from the starting position to the destination position or via one or more intermediate positions between the starting position and the destination position. In the latter case, the transportation route can define the order of intermediate positions the carrier can pass on its path from the starting position to the destination position. Typically, the starting position, the destination position, and the one or more intermediate positions between the starting position and destination position can be located at connected pre-analytical, analytical and post-analytical stations so that test sample processing steps according to predefined laboratory workflows can be conducted. For example, the starting position may be located at a connected pre-analytical station comprising a cap removal/fitting device for removing the cap from the test sample vessel and/or a carrier identification unit. The destination position may be located at a connected post-analytical station comprising a cap removal/fitting device for fitting a cap on the test sample vessel and/or a carrier identification unit. The one or more intermediate positions between the starting position and destination position may be located at one or more connected analytical stations where test samples can be aspirated out of the test sample vessel for analysis of the test sample. In one embodiment, the one or more analytical stations can comprise a carrier identification unit. Furthermore, the one or more intermediate positions may be located at dedicated areas on the transport plane for temporal placing or parking of carriers (i.e., buffering areas).

In one embodiment, the laboratory transport system can comprise a number of electro-magnetic actuators stationary arranged below the transport plane and configured to generate magnetic fields to move the carrier. The carrier can comprise a magnetically active device, which can interact with the magnetic fields so that a magnetic force can be applied to the carrier for moving the carrier over the transport plane. Such a laboratory transport system is well known in the art and may be designed as described in EP2566787B1, which is hereby incorporated by reference.

The term "control unit" as used herein can encompass any physical or virtual processing device comprising a processor, which can be configured to re-identify a carrier on a laboratory transport system after a system failure. The control unit can receive monitored motion positions from the monitoring system and can generate log data of the carrier and its associated identity based on the monitored motion positions. The control unit can predict the position of the identity based on the generated log data. In one embodiment, for predicting the position of the identity, the control unit can determine a vector based on the log data, can simulate motion positions of the carrier based on the determined vector, and can predict the position of the identity based on the simulated motion positions of the carrier. The control unit can further receive detected actual positions of the carrier from the monitoring system after reactivation of the laboratory transport system and can compare them with the predicted positions of the identity. If the predicted position of the identity matches with the actual position of the carrier, the control unit can assign the identity to the carrier.

In one embodiment, the control unit can be further configured to receive a determined identity from a carrier identification unit and to assign the determined identity to a carrier.

In a further embodiment, the control unit can be further configured to control the laboratory transport system in a way that a carrier can be moved from a starting position to a destination position on the transport plane. In one embodiment, the control unit can control a number of electromagnetic actuators stationary arranged below the transport plane and configured to generate magnetic fields to move the carrier from a starting position to a destination position.

In one embodiment, the control unit can receive information from a management unit regarding a carrier and/or payload, which may need to be transported from a starting position to a destination position.

In one embodiment, the control unit can define a transportation route or a part of the transportation route for a carrier. In one embodiment, the control unit can determine multiple transportation positions to define a transportation route or a part of the transportation route for a carrier.

In one embodiment, the control unit can further comprise a user interface for displaying and/or entering information regarding carriers and/or corresponding payloads, which may have to be transported.

The laboratory transport system can comprise a monitoring system configured to monitor motion positions of the carrier on the transport plane when the laboratory transport system is activated. As used herein, the term "monitoring" can relate to a process where the motion of a carrier on the transport plane can be tracked by detecting motion positions of the carrier on the transport plane over time when the laboratory transport system is activated. Such a monitoring system is well known in the art and may be designed as described in U.S. Pat. No. 9,567,167B2, which is hereby incorporated by reference. Although the monitoring system does not determine the identity over time on the transport plane, spatio-temporal information of the carrier and the identity on the transport plane can be acquired, as the identity is associated with the carrier. Based on this spatio-temporal information, "log data" of the carrier and the identity can be generated before a system failure occurs.

In one embodiment, the transport plane can comprise a plurality of transport positions. The monitoring system can comprise a sensor at each transport position to sense the carrier when the carrier is located on or at one of the plurality of transport positions. In step b), the log data of the carrier and associated identity can be generated based on time points when the carrier can be sensed by the sensors on or at the plurality of transport positions.

In a more specific embodiment, the sensors can be electromagnetic sensors comprised by the transport plane. As non-limiting examples inductive sensors, Hall sensors, capacitive sensors, resistive sensors, optical sensors may be used. Alternatively, the sensors can be thermal sensors or pressure sensors.

In one embodiment, the transport plane can comprise a plurality of transport positions, wherein multiple transport positions can define a transportation route on the transport plane and a carrier can move along the transportation route. For example, the transport plane may comprise thirty-six transport positions arranged in a right-angled grid. In one embodiment, the thirty-six transport positions may define a first set of six adjacent and substantially parallel transport routes each comprising six transport positions. In one embodiment, the thirty-six transport positions may define a first set of six adjacent and substantially parallel transport routes each comprising six transport positions and a second set of six adjacent and substantially parallel transport routes each comprising six-transport positions. The six substantially parallel transport routes of the first set can be substantially perpendicular to the six substantially parallel transport routes of the second set. In a further embodiment, a sequence of adjacent transport positions of the thirty-six transport positions may define a transport route on which the carriers can move along, e.g., a non-straight transport route comprising one or more changes of direction.

As used herein, the term "system failure" can relate to a situation or condition of the laboratory transport system where a reliable transportation of a carrier on the laboratory transport system is can longer be assured due to occurring hardware or software errors of the laboratory transport system. Thus, a system failure can occur because of a hardware failure of the laboratory transport system including the monitoring system, software issues, or both causing the laboratory transport system to stop functioning. A system failure can also cause a dissociation of the identity from the carrier as only the carrier may be monitored over time by the monitoring system on the transport plane. Furthermore, after a system failure, the carrier can keep moving in the same motion direction on the transport plane. Accordingly, the position of the carrier can deviate from the position of the identity and the carrier may need to be re-identified after reactivation for a reliable transportation of the carrier on the transport plane after a system failure.

As used herein, the term "re-identify or re-identification" can relate to a process where the dissociated identity can be assigned or re-associated with the carrier after a system failure by predicting the position of the dissociated identity, detecting the actual position of the carrier, comparing the predicted position of the dissociated identity with the actual position of the carrier, and assigning the dissociated identity to the carrier if the predicted position of the dissociated identity matches with the actual position of the carrier.

In one embodiment of the method, predicting the position of the identity can comprise the following: i) determining, by the control unit, a vector based on the log data. The vector comprises a motion direction of the carrier at the time of the system failure, ii) simulating, by the control unit, motion positions of the carrier based on the determined vector, and iii) predicting, by the control unit, the position of the identity based on the simulated motion positions of the carrier.

For example, the log data may comprise at least two subsequent motion positions of the carrier on the transport plane before the system failed. The two subsequent detected positions of the carrier can define a line or motion direction on which the carrier can keep moving after system failure. Thus, based on the two subsequent motion positions of the carrier, a vector comprising a motion direction can be determined. Accordingly, the vector can define only the motion direction. This information may be sufficient to simulate subsequent motion positions of the carrier and to predict the position of the disassociated identity, e.g., if the transport plane comprises only substantially parallel transportation routes on which only one carrier was moved at the time of system failure. In one embodiment of the method, simulating motion positions of the carrier can use a predefined transportation rule on the transport plane of the laboratory transport system. In one embodiment, the transportation rule can define one or more substantially parallel transportation routes on the transport plane over which the carrier can be moved. In another embodiment, the transportation rule can define that a carrier can only be moved in two dimensions or directions substantially perpendicular to each other on the transport plane. For example, a carrier may only be moved in two dimensions substantially perpendicular to each other on a transport plane comprising transport positions arranged in a right-angled grid.

In one embodiment of the method, the vector can further comprise a motion velocity of the carrier at the time of the system failure. Beside the motion direction, the motion velocity can also be determined based on the log data comprising at least two subsequent motion positions of the carrier on the transport plane before the system failed. If the log data comprises at least three subsequent motion positions of the carrier, it can also be determined if the motion velocity was constant, increasing (when the carrier was accelerating), or decreasing (when the carrier was decelerating) before the system failure occurred. Thus, the vector can comprise a motion direction and a motion velocity of the carrier, which can be used to simulate motion positions of the carrier after system failure and to determine where the carrier may stop on the transport plane. The position where the carrier may stop can then be the predicted position of the identity. Depending on the number of carriers moving on the transport plane and their positions on the transport plane, a vector comprising a motion direction and a motion velocity can be sufficient for simulating the motion positions of the carrier. For example, if only a few carriers are moving on the transport plane, which are not in close proximity to each other and not in close proximity to an edge of the transport plane, the carriers may not collide with each other or with the edge of the transport plane. Accordingly, the carriers may keep moving straight forward for a certain distance based on the velocity of the carrier at the time of system failure.

In one embodiment of the method, simulating the motion positions of the carrier can use a collision algorithm. For example, if a carrier is in close proximity to another carrier and/or in close proximity to an edge of the transport plane at the time of system failure, the carrier may collide with the other carrier or with the edge of the transport plane. Based on the log data of the carrier and the log data of the other carrier in the proximity or distance to each other can be determined. Furthermore, the log data of the carrier can also be used to determine the proximity or distance to the edge of the transport plane. Thus, one or more collisions of the carrier with one or more other carriers and/or one or more edges of the transport plane may be simulated in order to determine the position where the carrier may stop after a system failure. In one embodiment, a two-dimensional (2-D) collision algorithm can be used for simulation. Such 2-D collision algorithms are well known in the art. In one embodiment, a collision algorithm can only be used for simulating the motion positions of the carrier if the proximity of the carrier to another carrier or to the edge of the transport plane is below a predefined threshold.

In one embodiment of the method, simulating the motion positions of the carrier can use predefined transportation routes. Each transportation route can define a path or a part of the path the carrier can move from a defined starting position to a defined destination position on the transport plane of the laboratory transport system. As mentioned above, a transportation route may be defined by multiple transport positions on the transport plane. In one embodiment, all transport positions of the whole transportation route from a starting position to a destination position can be predefined. In an alternative embodiment, only the starting point, the destination point, and a sequence of transport positions of a part of the transportation route can be defined at a certain time point. Depending on the number of carriers and their corresponding transportation routes at a certain time point, parts of the transportation route of one or more carriers may be redefined in order to optimize all transportation routes of all carriers on the transport plane. This may be advantageous if a high number of carriers are moving on the transport plane at the same time.

Transport positions of a transportation route or part of the transportation route may be used for simulating the motion positions of a carrier. For example, if the log data of a carrier comprises a gap of motion positions or an unreliable motion position, transport positions of the transportation route or part of the transportation route may be used to fill the gap or to replace the unreliable motion positions for determining the vector. This may be advantageous if single sensor failures or errors occurred before the system failure occurred.

In one embodiment of the method, simulating the motion positions of the carrier can use one or more of the following features: a carrier feature, a transport plane feature, a test sample vessel feature, and/or a test sample feature.

As carrier features, transport plane features, and payload features such as test sample vessel features and test sample features may influence the motion of the carrier after system failure, these features may be used for simulating the motion positions of the carrier. A carrier feature can relate to the physical property of the carrier such as, as non-limiting examples, carrier weight, carrier dimension and/or geometric form, and the like. A transport plane feature can relate to the physical property of the transport plane such as, as non-limiting examples, texture or pollution of the transport plane. A test sample vessel feature can relate to the physical property of the test sample vessel such as, as non-limiting examples, test sample vessel weight, test sample vessel dimension and/or geometric form, and the like. A test sample feature can relate to the physical property of the test sample such as, as non-limiting examples, test sample volume, test sample weight, and the like. In one embodiment, carrier features, transport plane features, and payload features can be used to amend the motion direction and/or motion velocity of the vector after initial determination of the vector based on the log data.

In one embodiment of the method, simulating the motion positions of the carrier can use environmental parameters such as, as non-limiting examples, temperature or humidity of the laboratory space where the laboratory transport system is installed.

In one embodiment of the method, the predicted position of the identity can match with the actual position of the carrier if the actual position of the carrier lies within a predefined perimeter of the predicted position of the identity or if the predicted position of the identity lies with in a predefined perimeter of the actual position. Accordingly, a reliable re-identification of the carrier may be possible if the actual position of the carrier can deviate from the predicted position of the identity. The predefined perimeter may depend on the number of carriers moving on the transport plane and/or their positions to each other before a system failure occurs. For example, the closer the positions of the carriers to each other are, the smaller the perimeter can be.

In another embodiment, the predicted position of the identity can match with the actual position of the carrier if the predicted position of the identity and the actual position of the carrier lie within a predefined perimeter of a transport position of the transportation route or part of the transportation route of the carrier. Thus, transport positions of the transportation route or part of the transportation route of the carrier can be used for a reliable re-identification of the carrier if the actual position of the carrier deviates from the predicted position of the identity. In another embodiment, transport positions of the transportation route or part of the transportation route of a carrier can be used to confirm the match between the predicted position of the identity and the actual position of the carrier if the actual position of the carrier does not deviate from the predicted position of the identity. This can further improve the reliability of the re-identification of the carrier.

In one embodiment, the laboratory transport system can be connected to a carrier identification unit. The method can further comprise g) transporting, by the laboratory transport system, the carrier to a carrier identification unit if the predicted position of the identity does not match with the actual position of the carrier, h) determining, by the carrier identification unit, the identity of the carrier, and i) assigning, by the control unit, the determined identity to the carrier.

Depending on the number of the carriers and their transportation routes as well as their proximities to each other on the transport plane at the time of system failure, it may happen that not all carriers can be re-identified by the above-mentioned method. For example, a re-identification by the above-mentioned method may not be possible if two actual positions of two carriers lie within a predefined perimeter of a predicted position of an identity and outside perimeters of transport positions of their corresponding transportation routes. However, only carriers for which no identity can be assigned need to be identified by a carrier identification unit so that determined identities can assigned to the carriers. Accordingly, the carriers can resume their transportation to the destination points more quickly after system failure, which can lead to a shorter downtime of the laboratory system. The carrier identification unit may be a barcode or RFID tag reader. In one embodiment, the carrier identification may be comprised by a pre-analytical, analytical station, or post-analytical station connected to the laboratory transport system.

The present disclosure can also relate to a laboratory transport system. The laboratory transport system can comprise a carrier, a transport plane, a monitoring system, and a control unit. The carrier can be associated with an identity and the carrier can be configured to move over the transport plane. The monitoring system can be configured to monitor motion positions of the carrier on the transport plane when the laboratory transport system is activated. The laboratory transport system can be configured to execute the steps a) to f) of the method to re-identify a carrier on the laboratory transport system.

In one embodiment of the laboratory transport system, the laboratory transport system can be connected to a carrier identification unit. The laboratory transport system can be configured to execute the steps g) to i) of the method as described above.

The present disclosure can further relate to a computer program product comprising instructions to cause the laboratory transport system as described herein to execute the steps of the method to re-identify a carrier on the laboratory transport system as described herein.

The present disclosure can further relate to a computer-readable storage medium having stored thereon the computer program product comprising instructions to cause the laboratory transport system as described herein to execute the steps of the method to re-identify a carrier on the laboratory transport system as described herein.

Referring initially to FIG. 1, in FIG. 1, a schematic representation of an embodiment of a laboratory system (13) comprising a laboratory transport system (12) is shown. The laboratory transport system (12) can comprise a transport plane (16), a monitoring system (18), and a control unit (20). In the shown embodiment, the transport plane (16) can have a quadratic form and can comprise thirty-six transport positions A1 to F6 (38) arranged in a right-angled grid. However, the transport plane (16) may have any geometric form and may comprise more or less transport positions. In the shown embodiment, a carrier identification unit (36) can be connected at the transport position D1, which can be a starting position (30). An analytical station (37) can be connected at the transport position A4, which can be a destination position (32). Thus, the laboratory transport system (12), the carrier identification unit (36), and the analytical station (37) can form the laboratory system (13). As shown in FIG. 1, a carrier (10) which can be associated with an identity (14) can be located on the starting position D1 (30). A non-straight transportation route (31) of the carrier (10) from the starting position D1 (30) to the destination position A4 (32) is shown in FIG. 2. As further shown in FIG. 1, the monitoring system (18) can comprise thirty-six sensors (40) located at each of the 36 transport positions A1 to F6 (38). The sensors (40) can be configured to sense the carrier (10) when the carrier (10) is located on or at one of the plurality of transport positions A1 to F6 (38). The control unit (20) can be communicatively connected to the monitoring system (16). In the shown embodiment, the control unit (20) can also be communicatively connected to the carrier identification unit (36).

Figures 2A, 2B:
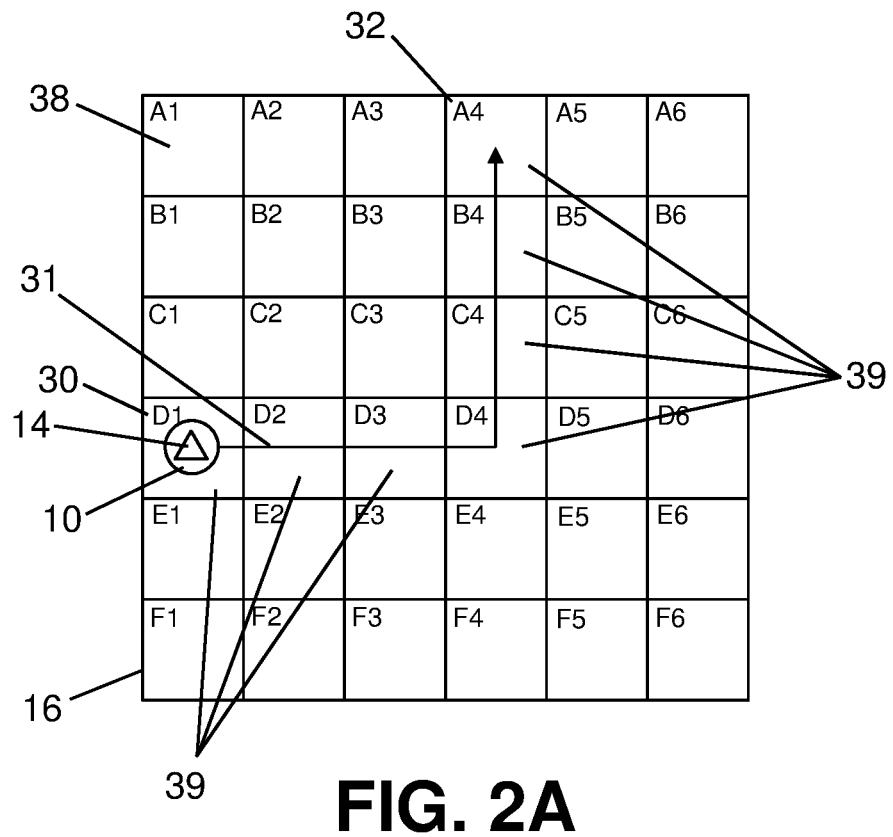
FIGS. 2A-2B illustrate an example of a transportation route of a carrier on the transport plane and corresponding log data when the laboratory transport system is activated according to an embodiment of the present disclosure.

FIGS. 2A-B show an example of a transportation route (31) of a carrier (10) on the transport plane (16) and corresponding log data (22) when the laboratory transport system (12) is activated. FIG. 2A shows the same quadratic transport plane (16) and thirty-six transport positions A1 to F6 (38) as shown in FIG. 1. The carrier (10) which can be associated with an identity (14) can move along a predefined transportation route (31) on the transport plane (16) as indicated by a solid arrow. For example, the carrier (10) may move by applying magnetic forces to the carrier (10). In the shown example, the transportation route (31) can be defined by the seven successive transport positions D1, D2, D3, D4, C4, B4, and A4, wherein the first transport position D1 can be the starting position (30) and the last transport position A4 can be the destination position (32). Thus, the carrier (10) can move along the seven successive transport positions D1, D2, D3, D4, C4, B4, and A4 in order to move from the starting position (30) to the destination position (32), wherein at transport position D4, the carrier (10) can turn left at a right angle. On its way from the starting position (30) to the destination position (32), the monitoring system (not shown) can monitor motion positions (39) of the carrier (10) on the transport plane (16).

FIG. 2B shows the corresponding log data (22) when the carrier (10) which can be associated with an identity ABC123 (14) moved from the starting position (30) to the destination position (32) according to the transportation route (31) as described in FIG. 2A. The shown log data (22) of the carrier (10) which can be associated with the identity ABC123 (14) can represent spatial-temporal information of the carrier (10) and the identity (14) on the transport plane (16) as the identity (14) can be associated with the carrier (10). The log data (22) of the carrier (10) associated with the identity ABC123 (14) can comprise motion positions (39) for each time point (41) the carrier (10) was sensed at a transport position of the transportation route (31). Thus, at a first time point TP 1 (41), the carrier (10) associated with the identity ABC123 (14) was sensed at transport position D1, which can be the first motion position (39) of the carrier (10). At the second time point TP 2 (41), the carrier (10) associated with the identity ABC123 (14) was sensed at transport position D2, which can be the second motion position (39) of the carrier (10) and so on.

Figures 3A, 3B:
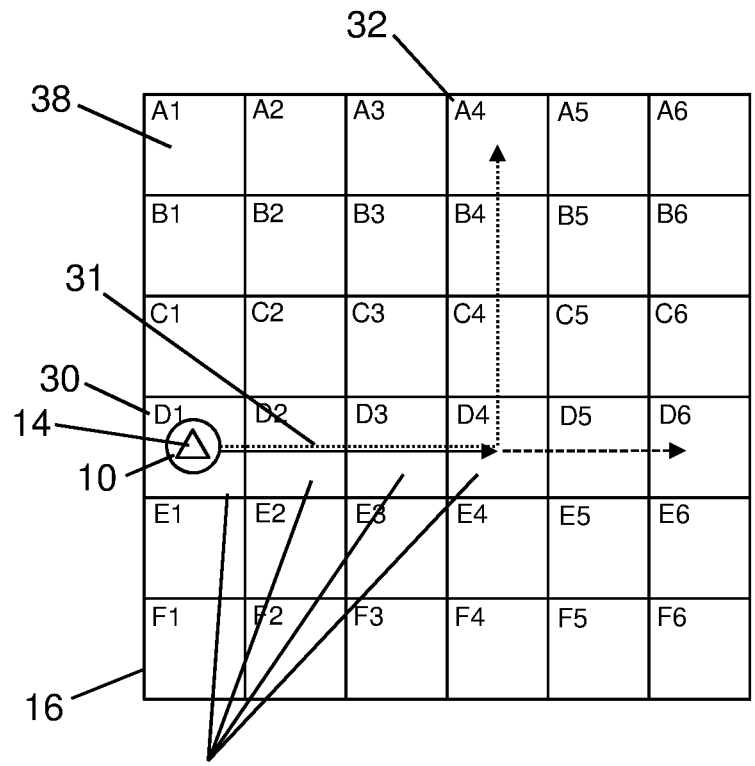

FIGS. 3A-B show an example of how the carrier (10) can move on the transport plane (16) before and after a system failure (23) and corresponding log data (22) of the carrier (10). FIGS. 3C-E show an embodiment of how the carrier (10) can be re-identified after the system failure (23). FIG. 3A shows the same transport plane (16) and thirty-six transport positions A1 to F6 (38) as shown in FIG. 2. The transportation route (31) as shown in FIG. 2 is indicated by a dotted arrow in FIG. 3A. As indicated by a solid arrow, the carrier (10) can move from the starting position D1 (30) to the transport position D4 when the laboratory transport system is activated. For example, the carrier (10) may move by applying magnetic forces to the carrier (10). Then, after time point TP 4 (41) when the carrier (10) is located at transport position D4 a system failure (23) occurred. Based on the system failure (23), no magnetic forces are applied anymore to the carrier (10) and no motion positions are monitored by the monitoring system (18).

As shown in FIG. 3A, instead of turning left at a right angle at transport position D4 and moving along the predefined transportation route (31), the carrier can keep moving straight forward on the transport plane (16) and can move to transport position D6 as indicated by a dashed arrow.

FIG. 3B shows the corresponding log data (22) of the carrier (10) which can be associated with an identity ABC123 (14) before and after the system failure (23) which can occurred between time point TP 4 (41) and time point TP 5 (41) as indicated by an arrow at the left side of the log data (22). The log data (22) of the carrier (10) associated with the identity ABC123 (14) can comprise motion positions (39) for the first four time points TP 1 to TP 4 (41) when the carrier (10) was sensed at transport positions D1, D2, D3, and D4 (38). Thus, at a first time point TP 1 (41), the carrier (10) associated with the identity ABC123 (14) was sensed at transport position D1 (38), which can be the first motion position (39) of the carrier (10) in the log data (22). At a second time point TP 2 (41), the carrier (10) associated with the identity ABC123 (14) was sensed at transport position D2 (38), which can be the second motion position (39) of the carrier (10). At a third time point TP 3 (41), the carrier (10) associated with the identity ABC123 (14) was sensed at transport position D3 (38), which can be the third motion position (39) of the carrier (10). At a fourth time point TP 4 (41), the carrier (10) associated with the identity ABC123 (14) was sensed at transport position D4 (38), which can be the fourth motion position (39) of the carrier (10). Due to the system failure (23), no further motion positions are monitored at later time points. At time point TP 4 before the system failure (23) occurred, the associated identity (14) was localized on transport position D4 (38). As the carrier (10) carrier kept moving straight forward to transport position D6 after time point TP 4 and no further motion positions were monitored, the associated identity (14) can be dissociated from the carrier (10) as indicated by asterisks in the log data (22).

As shown in FIG. 3C, a vector (28) based on the log data (22) can be determined by the control unit (20). For example, the last two monitored motion positions D3 and D4 (39) and corresponding time points TP 3 and TP 4 (41) can be used to determine a motion direction as depicted by the orientation of the shown vector (28) and a motion velocity as depicted by the length of the shown vector (38). As indicated by a dotted arrow in FIG. 3C, the determined vector (28) can be used to simulate motion positions D5 and D6 (39) of the carrier (10) in order to predict the position of the identity ABC123 (14). The predicted position (24) of the identity ABC123 (14) can be transport position D6 as shown in FIGS. 3C and 3E.

FIG. 3D shows the same transport plane (16) and transport positions A1 to F6 (38) as shown in FIG. 3C. The actual position (26) of the carrier (10) can be detected by the monitoring system (18) after reactivation (25) of the laboratory transport system (12) as shown in FIGS. 3D and 3E. In the shown example, the carrier (10) can be detected on transport position D6 at time point TP 6 (41). As the predicted position (24) of the identity ABC123 (14) as shown in FIG. 3C can be the same as the actual position (26) of the carrier (10) as shown in FIG. 3D, the control unit (20) can assign the identity ABC123 (14) to the carrier (10). Accordingly, the carrier (10) can be again associated with an identity ABC123 (14) and the log data (22) of the carrier (10) associated with the identity ABC123 (14) can now comprise a motion position (39) for time point TP 7 as shown in FIG. 3E.

Figure 4A:
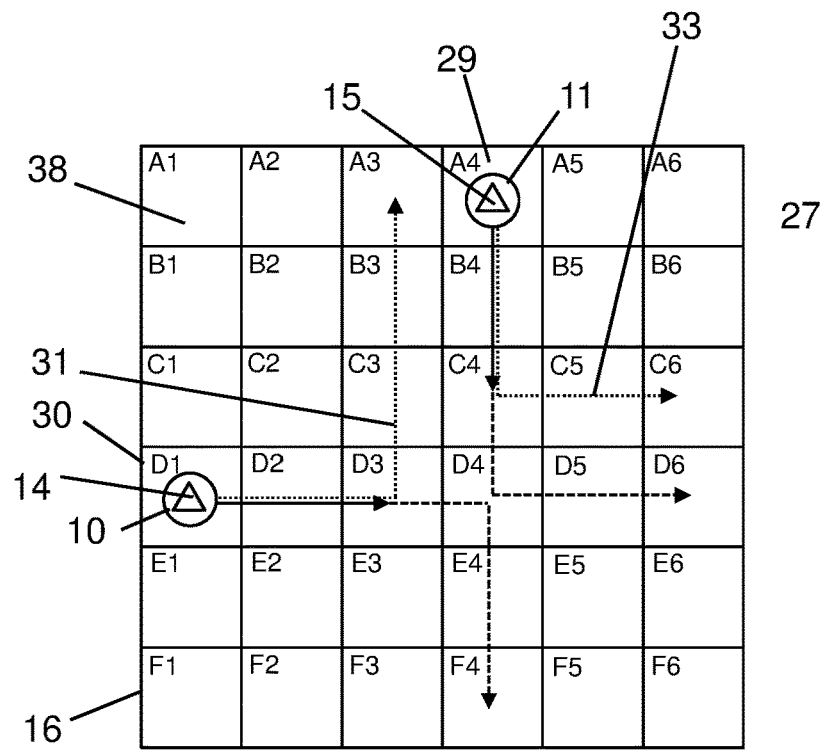
FIGS. 4A-4B illustrates an example of how a carrier and a further carrier move on the transport plane before and after a system failure according to an embodiment of the present disclosure.
Figure 4B:
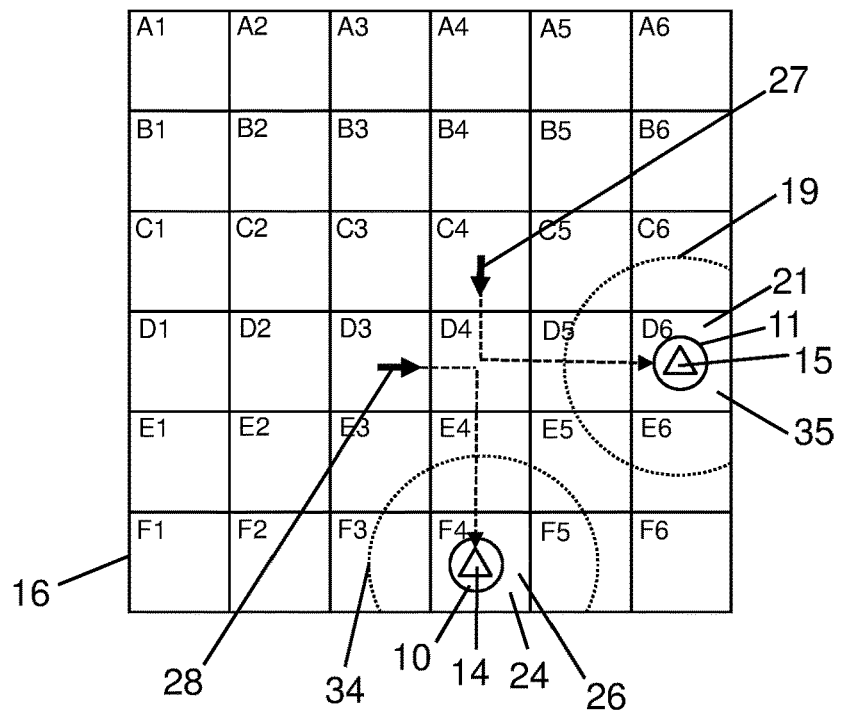

FIG. 4A shows an example of how a carrier (10) and a further carrier (11) can move on the transport plane (16) before a system failure and FIG. 4B shows an example of how a carrier (10) and a further carrier (11) can move on the transport plane (16) after a system failure. FIGS. 4A-B show the same transport plane (16) and transport positions A1 to F6 (38) as shown in FIG. 1. In FIG. 4A, a transportation route (31) of the carrier (10) associated with an identity (14) is indicated by a dotted arrow. As indicated by a solid arrow, the carrier (10) can move from a starting position D1 (30) to the transport position D3 (38) when the laboratory transport system is activated. The carrier (10) may move by applying magnetic forces to the carrier (10). A further carrier (11) associated with a further identity (15) can be moving on the transport plane (16). A further transportation route (33) of the further carrier (11) is indicated by a dotted arrow. As indicated by a solid arrow, the further carrier (11) can move from a further starting position A4 (29) to the transport position C4 when the laboratory transport system is activated. In addition, the further carrier (11) may move by applying magnetic forces to the further carrier (11). For simplification, the carrier (10) and the further carrier (11) can have equal velocities, carrier features, sample tube features, and test sample features. Thus, both carriers can possess equal motion behaviors on the transport plane (16). At the time when the carrier (10) is located at transport position D3 (38) and the further carrier (11) is located at transport position C4 (38), a system failure can occur. Based on the system failure, no magnetic forces may be applied to the carrier (10) and further carrier (11). In addition, no motion positions for both carriers may be monitored by the monitoring system (18). As shown in FIG. 4A, instead of turning left at a right angle at transport position D3 (38) and moving along the predefined transportation route (31), the carrier (10) can keep moving straight forward on the transport plane (16). Similarly, the further carrier (11) can keep moving straight forward on the transport plane (16) instead of turning left at a right angle at transport position C4 (38). As a result, the carrier (10) and further carrier (11) may collide at transport position D4 (38). Based on this collision, both carriers (10, 11) can change their motion direction so that the carrier (10) can move to transport position F4 (38) and the further carrier (11) can move to the transport position D6 (38) as indicated by dashed arrows.

As shown in FIG. 4B, a vector (28) and a further vector (27) based on the log data of the carrier (10) and further carrier (11) can be determined by the control unit (20). As indicated by dashed arrows in FIG. 4B, the determined vectors (27, 28) can be used to simulate motion positions of the carrier (10) and the further carrier (11) in order to predict a position F4 (24) of the identity (14) and a position D6 (21) of the further identity (15). For simulating the motion positions of the carrier (10) and further carrier (11), a collision algorithm can be used. After reactivation of the laboratory transport system (12), the actual position F4 (26) of the carrier (10) and the actual position D6 (35) of the further carrier (11) can be detected by the monitoring system (18). As the predicted position F4 (24) of the identity (14) can be the same as the actual position F4 (26) of the carrier (10), the control unit (20) can assign the identity (14) to the carrier (10). The control unit (20) may also assign the identity (14) to the carrier (10) if the actual position of the carrier (10) lies within a predefined perimeter (34) of the predicted position F4 (24) of the identity (14). Furthermore, as the predicted position D6 (35) of the further identity (15) can be the same as the actual position D6 (35) of the further carrier (11), the control unit (20) can assign the further identity (15) to the further carrier (11). The control unit (20) may also assign the further identity (15) to the further carrier (11) if the actual position of the further carrier (11) lies within a further predefined perimeter (19) of the predicted position D6 (21) of the further identity (15).

Figures 5A, 5B:
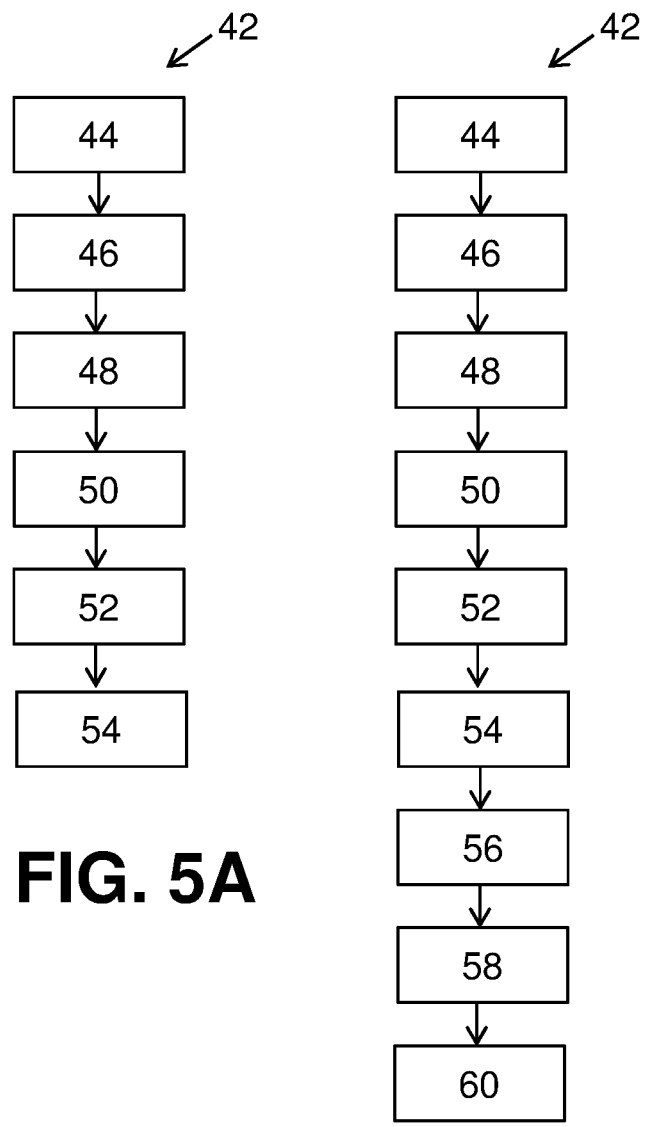
FIG. 5A-5B illustrates flowcharts of embodiments of the method to re-identify a carrier on a laboratory transport system according to an embodiment of the present disclosure.

FIGS. 5A-B show flowcharts of embodiments of the method (42) to re-identify a carrier (10) on a laboratory transport system (12). As shown in FIG. 1, the carrier (10) can be associated with an identity (14) and can be configured to move over a transport plane (16) of the laboratory transport system (12). The laboratory transport system (12) can comprise a monitoring system (18) configured to monitor motion positions (39) of the carrier (10) on the transport plane (16) when the laboratory transport system (12) is activated. In addition, the laboratory transport system (12) can comprise a control unit (20). FIG. 5A shows a first embodiment of the method (42) where in step a) (44) of the method (42), the monitoring system (18) can monitor motion positions (39) of the carrier (10) on the transport plane (16). Then, the control unit (20) can generate log data (22) of the carrier (10) and the associated identity (14) based on the monitored motion positions (39) in step b) (46) of the method (42). After a system failure (23) of the laboratory transport system (12), the control unit (20) can predict the position (24) of the identity (14) based on the generated log data (22) and, in step c) (48) of the method (42), as the system failure (23) caused a dissociation of the identity (14) from the carrier (10). After the system failure (23), the carrier (10) can keep moving on the transport plane (16) and, in step d) (50) of the method (42), the monitoring system (18) can detect the actual position (26) of the carrier (10) after reactivation of the laboratory transport system (12). Step c) (48) and step d) (50) of the method (42) may be executed simultaneously. Subsequently, the control unit (20)

can compare the predicted position (24) of the identity (14) with the actual position (26) of the carrier (10) in step e) (52) of the method (42). In step f) (54) of the method (42), the control unit (20) can assign the identity (14) to the carrier (10) if the predicted position (24) of the identity (14) matches with the actual position (26) of the carrier (10) in order to re-identify the carrier (10) on the laboratory transport system (12).

FIG. 5B shows a second embodiment of the method (42) if the predicted position (24) of the identity (14) does not match with the actual position (26) of the carrier (10) and the laboratory transport system (12) is connected to a carrier identification unit (36). Steps a) to f) (44, 46, 48, 50, 52, 54) of the second embodiment of the method (42) are the same steps a) to f) (44, 46, 48, 50, 52, 54) as described above for the first embodiment. However, if the predicted position (24) of the identity (14) does not match with the actual position (26) of the carrier (10) in step f) (54) of the method (42), the laboratory transport system (12) can transport the carrier (10) to a carrier identification unit (36) in step g) (56) of the method (42). The carrier identification unit (36) can determine the identity (14) of the carrier (10) in step h) (58) of the method (42). In addition, in step i) (60) of the method (42), the control unit (20) can assign the determined identity (14) to the carrier (10).

In the preceding description and figures, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Reference throughout the preceding specification to "one embodiment", "an embodiment", "one example" or "an example", can mean that a particular feature, structure or characteristic described in connection with the embodiment or example is included in at least one embodiment. Thus, appearances of the phrases "in one embodiment", "in an embodiment", "one example" or "an example", in various places throughout this description may not necessarily be all referring to the same embodiment or example.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method to re-identify a carrier on a laboratory transport system, wherein the carrier is associated with an identity, wherein the carrier is configured to move over a transport plane of the laboratory transport system, wherein the laboratory transport system comprises a monitoring system configured to monitor motion positions of the carrier on the transport plane when the laboratory transport system is activated, wherein the laboratory transport system comprises a control unit, the method comprising:
   a) monitoring, by the monitoring system, motion positions of the carrier on the transport plane;
   b) generating, by the control unit, log data of the carrier and the associated identity based on the monitored motion positions;
   c) predicting, by the control unit, the position of the identity based on the generated log data after a system failure of the laboratory transport system, wherein the system failure is a monitoring system failure that causes dissociation of the identity from the carrier, wherein after the system failure, the carrier keeps moving on the transport plane;
   d) detecting, by the monitoring system, the actual position of the carrier after reactivation of the laboratory transport system;
   e) comparing, by the control unit, the predicted position of the identity with the actual position of the carrier; and
   f) assigning, by the control unit, the identity to the carrier if the predicted position of the identity matches with the actual position of the carrier.

2. The method according to claim 1, wherein predicting the position of the identity comprises,
   i) determining, by the control unit, a vector based on the log data, wherein the vector comprises a motion direction of the carrier at the time of the system failure,
   ii) simulating, by the control unit, motion positions of the carrier based on the determined vector, and
   iii) predicting, by the control unit, the position of the identity based on the simulated motion positions of the carrier.

3. The method according to claim 2, wherein the vector further comprises a motion velocity of the carrier at the time of the system failure.

4. The method according to claim 2, wherein simulating the motion positions of the carrier uses a predefined transportation rule on the transport plane of the laboratory transport system.

5. The method according to claim 2, wherein simulating the motion positions of the carrier uses a collision algorithm simulating one or more collisions of the carrier with one or more other carriers and/or one or more edges of the transport plane.

6. The method according to claim 2, wherein simulating the motion positions of the carrier uses predefined transportation routes, wherein each transportation route defines a path or a part of the path the carrier moves from a defined starting position to a defined destination position on the transport plane of the laboratory transport system.

7. The method according to claim 2, wherein simulating the motion positions of the carrier uses one or more of the following features: a carrier feature, a transport plane feature, a sample tube feature, and/or a test sample feature.

8. The method according to claim 1, wherein the predicted position of the identity matches with the actual position of the carrier if the actual position of the carrier lies within a predefined perimeter of the predicted position of the identity or if the predicted position of the identity lies within a predefined perimeter of the actual position of the carrier.

9. The method according to claim 1, wherein the laboratory transport system is connected to a carrier identification unit, wherein the method further comprises,
   g) transporting, by the laboratory transport system, the carrier to a carrier identification unit if the predicted position of the identity does not match with the actual position of the carrier;
   h) determining, by the carrier identification unit, the identity of the carrier; and
   i) assigning, by the control unit, the determined identity to the carrier.

10. The method according to claim 1, wherein the laboratory transport system comprises a number of electromagnetic actuators being stationary arranged below the transport plane and configured to generate magnetic fields to move the carrier, wherein each carrier comprises a magnetically active device which can interact with the magnetic fields so that a magnetic force is applied to the carrier for moving the carrier over the transport plane.

11. The method according to claim 1, wherein the transport plane comprises a plurality of transport positions, wherein the monitoring system comprises a sensor at each transport position to sense the carrier when the carrier is located on or at one of the plurality of transport positions, wherein in step b) the log data of the carrier and associated identity is generated based on time points when the carrier is sensed by the sensors on or at the plurality of transport positions.

12. The method according to claim 11, wherein the sensors are electromagnetic sensors comprised by the transport plane.

13. A laboratory transport system, the laboratory transport system comprising:
   a carrier, wherein the carrier is associated with an identity;
   a transport plane, wherein the carrier is configured to move over the transport plane;
   a monitoring system, wherein the monitoring system is configured to monitor motion positions of the carrier on the transport plane when the laboratory transport system is activated; and
   a control unit, wherein the laboratory transport system is configured to execute the method according to claim 1.

* * * * *